United States Patent
Hill

(10) Patent No.: US 6,839,141 B2
(45) Date of Patent: Jan. 4, 2005

(54) METHOD AND APPARATUS FOR COMPENSATION OF TIME-VARYING OPTICAL PROPERTIES OF GAS IN INTERFEROMETRY

(75) Inventor: Henry A. Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 10 days.

(21) Appl. No.: 10/350,522

(22) Filed: Jan. 24, 2003

(65) Prior Publication Data

US 2003/0186134 A1 Oct. 2, 2003

Related U.S. Application Data

(60) Provisional application No. 60/352,061, filed on Jan. 24, 2002.

(51) Int. Cl.[7] ................................................. G01B 9/02
(52) U.S. Cl. ..................... 356/486; 356/498; 356/500
(58) Field of Search .............................. 356/486, 487, 356/493, 498, 500

(56) References Cited

U.S. PATENT DOCUMENTS

| | | | |
|---|---|---|---|
| 4,498,254 A | | 2/1985 | Ishida |
| 5,114,234 A | * | 5/1992 | Otsuka et al. .............. 356/500 |
| 5,404,222 A | | 4/1995 | Lis |
| 5,483,343 A | | 1/1996 | Iwamoto et al. |
| 5,715,057 A | | 2/1998 | Bechstein et al. |
| 5,764,362 A | | 6/1998 | Hill et al. |
| 6,327,039 B1 | | 12/2001 | de Groot et al. ............ 356/517 |
| 6,330,065 B1 | | 12/2001 | Hill ............................ 356/485 |
| 6,417,927 B2 | | 7/2002 | de Groot |

OTHER PUBLICATIONS

Bennett, S.J. "A Double–Pased Michelson Interperometer." *Optics Communications*, 4:6, pp. 428–430, 1972.
Bobroff, N. "Recent advances in displacement measuring interferometry." *Meas. Sci. Technol*, 4: pp. 907–926, 1993.
Oka, K. et al. "Polarization heterodyne interferometry using another local oscillator beam." *Optics Communications*, 92, pp. 1–5, 1992.

* cited by examiner

*Primary Examiner*—Samuel A. Turner
(74) *Attorney, Agent, or Firm*—Fish & Richardson P.C.

(57) ABSTRACT

In general, in one aspect, the invention features a method, including interferometrically measuring first and second optical path lengths to a measurement object along respective first and second paths, wherein the measurement of the optical path lengths includes directing first and second measurement beams to reflect from the measurement object, measuring propagation directions of the first and second measurement beams, compensating the first measured optical path length for time-varying optical properties of gas in the first path based on the first and second measured optical path lengths and the first and second measured propagation directions.

33 Claims, 10 Drawing Sheets

METHOD AND APPARATUS FOR COMPENSATION OF TIME-VARYING OPTICAL PROPERTIES OF GAS IN INTERFEROMETRY

CROSS-REFERENCE TO RELATED APPLICATIONS

This application claims priority to Provisional Patent Application No. 60/352,061, entitled "NON-DISPERSIVE METHOD AND APPARATUS FOR COMPENSATION OF TURBULENCE EFFECTS OF GAS IN INTERFEROMETERY," filed on Jan. 24, 2002, the entire contents of which are incorporated herein by reference.

BACKGROUND

Displacement-measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam splitter to direct the measurement and reference beams to the measurement and reference objects, respectively, and combine the reflected measurement and reference beams to form overlapping exit measurement and reference beams. The overlapping exit beams form an output beam that subsequently passes through a polarizer.

The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams. A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2\, vnp/\lambda$, where v is the relative speed of the measurement and reference objects, X is the wavelength of the measurement and reference beams, n is the refractive index of the medium through which the light beams travel, e.g., air or vacuum, and p is the number of passes to the reference and measurement objects. Changes in the relative position of the measurement object correspond to changes in the phase of the measured interference signal, with a $2\pi$ phase change substantially equal to a distance change L of $\lambda/(np)$, where L is a round-trip distance change, e.g., the change in distance to and from a stage that includes the measurement object.

Unfortunately, this equality is not always exact. In addition, the amplitude of the measured interference signal may be variable. A variable amplitude may subsequently reduce the accuracy of measured phase changes. Many interferometers include non-linearities such as what are known as "cyclic errors." The cyclic errors can be expressed as contributions to the phase and/or the intensity of the measured interference signal and have a sinusoidal dependence on the change in optical path length pnL. In particular, the first harmonic cyclic error in phase has a sinusoidal dependence on $(2\pi pnL)/\lambda$ and the second harmonic cyclic error in phase has a sinusoidal dependence on $2\,(2\pi pnL)/\lambda$. Higher harmonic cyclic errors can also be present.

Another source of errors are related to environmental effects such as air turbulence and non-isotropic distributions of gases in the interferometer environment. See, for example, an article entitled "Residual Errors In Laser Interferometry From Air Turbulence And Nonlinearity," by N. Bobroff, *Appl. Opt.* 26(13), 2676–2682 (1987), and an article entitled "Recent Advances In Displacement Measuring Interferometry," also by N. Bobroff, *Measurement Science & Tech.* 4(9), 907–926 (1993). As noted in the aforementioned cited references, interferometric displacement measurements in a gas are subject to environmental uncertainties, particularly to changes in air pressure and temperature; to uncertainties in air composition such as resulting from changes in humidity and/or the presence of additional gases; and to the effects of turbulence in the gas. These time-varying optical properties of gas in a beam path alter the wavelength of the light used to measure the displacement. Under normal conditions, the refractive index of air for example is approximately 1.0003 with a variation of the order of $1\times10^{-5}$ to $1\times10^{-4}$. In many applications the refractive index of air must be known with a relative precision of less than 0.1 ppm (parts per million) to less than 0.001 ppm, these two relative precisions corresponding to a displacement measurement accuracy of 100 nm and less than 1 nm, respectively, for a one meter interferometric displacement measurement.

One way to detect refractive index fluctuations is to measure changes in pressure and temperature along a measurement path and calculate the effect on the optical path length of the measurement path. Another, more direct way to detect the effects of a fluctuating refractive index over a measurement path is by multiple-wavelength distance measurement. The basic principle may be understood as follows. Interferometers and laser radar measure the optical path length between a reference and an object, most often in open air. The optical path length is the integrated product of the refractive index and the physical path traversed by a measurement beam. In that the refractive index varies with wavelength, but the physical path is independent of wavelength, it is generally possible to determine the physical path length from the optical path length, including, in particular, the contributions of fluctuations in refractive index, provided the instrument employs at least two wavelengths. The variation of refractive index with wavelength is known in the art as dispersion and this technique is often referred to as the dispersion technique or as dispersion interferometry.

SUMMARY

In certain aspects, the invention features methods and systems for compensating interferometry measurements for time-varying optical properties of gas in the path of an interferometer measurement beam (and/or reference beam). As discussed above, time-varying optical properties of gas in an interferometer beam path give rise to uncertainty in interferometry measurements because, even if all the components are stationary, the refractive index of the gas can vary. These variations can give rise to differences in measured optical path length values, even if the physical path length remains unchanged during the measurements. In addition to affecting optical path length, time-varying optical properties of gas also affect the propagation direction of a measurement beam (and/or reference beam). However, the amount by which variations in the optical properties of the gas affects the optical path length is related to the amount the variations affect the beam propagation direction. Accordingly, when this relationship is known, a measurement of the beam propagation direction can be used to compensate for time-varying affects of the gas on the optical path length measurement.

The situation becomes more complicated when components of the interferometer are not stationary. In particular, in many interferometers (e.g., single beam plane mirror interferometers) a change in the orientation of the measurement object will cause a variation in beam propagation direction. Without additional information (e.g., the amount by which the orientation of the measurement object changes), it is not possible to decouple the change in propagation direction due to time-varying optical properties of the gas from the change in propagation direction due to an orientation change of the measurement object. This is the case in many interferometry applications, such as, for example, in photolithography systems where an interferometry system is used to monitor the position of a moving wafer stage during exposure of a wafer. Accordingly, in certain aspects, the invention features systems and methods which compensate for time-varying optical properties of a gas in a beam path while one or more components of the interferometry system may be moving.

The optical properties of a gas are determined by a number of physical parameters, each of which can vary as a function of time. These parameters include gas turbulence, gas composition, and thermodynamic properties of the gas. Accordingly, systems and methods described herein can compensate for the effect of variations of one or more of these parameters on an interferometry measurement.

The systems and methods are applicable to lithography tools.

Descriptions of various aspects of the invention follow.

In general, in one aspect, the invention features a method, including interferometrically measuring first and second optical path lengths to a measurement object along respective first and second paths, wherein the measurement of the optical path lengths includes directing first and second measurement beams to reflect from the measurement object, measuring propagation directions of the first and second measurement beams, compensating the first measured optical path length for time-varying optical properties of gas in the first path based on the first and second measured optical path lengths and the first and second measured propagation directions.

Embodiments of the method may include one or more of the following features and/or features of other aspects.

Compensating the first measured optical path length can further include compensating the first measured optical path length based on earlier measurements of the first and second optical path lengths and the first and second propagation directions. Compensating the first measured optical path length can additionally include compensating the first measured optical path length based on the velocity of gas in the first and second paths. Compensating the measured optical path length can include determining a corrected optical path length, $x_{1,0}$, according to the equation:

$$x_{1,0} = x_1 - u \int \left\{ \theta_1 - \left[\frac{x_2 - x_1}{b} - \left(\frac{u}{b}\right)\int (\theta_2 - \theta_1) dt\right]\right\} dt$$

where $x_1$ and $x_2$ are the first and second measured optical path lengths, respectively, $\theta_1$ and $\theta_2$ are the first and second propagation directions, respectively, b is a distance between the first and second measurement beams, and u is a component of the gas velocity perpendicular to the beams and in the plane of the beams.

The propagation directions of the first and second measurement beams can be measured interferometrically.

The method can include deriving the first and second measurement beams from an input beam, and the input beam propagation direction can be adjusted based on variations in the propagation direction of the first or second measurement beams.

In another aspect, the invention features a method, including interferometrically measuring an optical path length to a measurement object along a first path, wherein the measurement of the optical path length includes directing a measurement beam to reflect from the measurement object. The method further includes measuring (e.g., interferometrically measuring) a propagation direction of the measurement beam, and compensating the measured optical path length for time-varying optical properties of gas in the first path based on the measured propagation direction.

Embodiments of the method may include one or more of the following features and/or features of other aspects.

Compensating the measured optical path length can include compensating the measured optical path length based on a velocity of gas in the first path.

The method can include measuring a second optical path length to the measurement object along a second path substantially parallel to the first path. In addition, the method can include measuring a propagation direction of the second measurement beam. The propagation direction of the second measurement beam can be measured interferometrically. Compensating the measured optical path length can include compensating the measured optical path length based on the measured propagation direction of the second measurement beam and the velocity of gas in the second path. The measured optical path length can also be compensated based on previous optical path length and measurement beam propagation direction measurements. In some embodiments, compensating the measured optical path length includes determining a corrected optical path length, $x_{1,0}$, according to the equation:

$$x_{1,0} = x_1 - u \int \left\{ \theta_1 - \left[\frac{x_2 - x_1}{b} - \left(\frac{u}{b}\right)\int (\theta_2 - \theta_1) dt\right]\right\} dt$$

where $x_1$ and $x_2$ are the first and second measured optical path lengths, respectively, $\theta_1$ and $\theta_2$ are the first and second beam directions, respectively, b is a distance between the first and second measurement beams, and u is the component of the gas velocity perpendicular to the beams and in the plane of the beams.

The propagation direction of the measurement beam can be measured after the measurement beam reflects from the measurement object an odd number of times (e.g., once).

Measuring the optical path length can include generating a heterodyne signal from the measurement beam and determining an interference phase from the heterodyne signal.

In embodiments which include measuring a second optical path length to the measurement object along a second path substantially parallel to the first path, the first measured optical path length can be compensated for variations in the orientation of the measurement object based on the second measured optical path length and a distance between the first and second measurement beams.

The method can include deriving the measurement beam from an input beam. The input beam propagation direction can be adjusted based on variations in the propagation direction of the first measurement beam.

In a further aspect, the invention features interferometry systems configured to implement the aforementioned methods.

In one aspect, the invention features an interferometry system, including an interferometer configured to direct a measurement beam to reflect from a measurement object and interferometrically measure an optical path length to the measurement object along a first path based on the reflected measurement beam, and an angular displacement interferometer, configured to measure a propagation direction of the reflected measurement beam. The interferometry system also includes a controller in communication with the interferometer and the angular displacement interferometer, wherein during operation the controller compensates the measured optical path length for time-varying optical properties of gas in the first path based on the measured optical path length and measured propagation direction.

Embodiments of the interferometry system may include features of other aspects and/or can be configured to implement methods of other aspects.

In a further aspect, the invention features a lithography method for use in fabricating integrated circuits on a wafer, which includes supporting the wafer on a moveable stage, imaging spatially patterned radiation onto the wafer, adjusting the position of the stage, and monitoring the position of the stage using one of the aforementioned methods.

In another aspect, the invention features a lithography method for use in the fabrication of integrated circuits, which includes directing input radiation through a mask to produce spatially patterned radiation, positioning the mask relative to the input radiation, monitoring the position of the mask relative to the input radiation using one of the aforementioned methods, and imaging the spatially patterned radiation onto a wafer.

In a further aspect, the invention features a lithography method for fabricating integrated circuits on a wafer, which includes positioning a first component of a lithography system relative to a second component of a lithography system to expose the wafer to spatially patterned radiation, and monitoring the position of the first component relative to the second component using the one of the aforementioned methods.

In another aspect, the invention features a method for fabricating integrated circuits, the method including one of the aforementioned lithography methods.

In an additional aspect, the invention features a beam writing method for use in fabricating a lithography mask. The method includes directing a write beam to a substrate to pattern the substrate, positioning the substrate relative to the write beam, and monitoring the position of the substrate relative to the write beam using one of the aforementioned interferometry methods.

In another aspect, the invention features a lithography system for use in fabricating integrated circuits on a wafer. The system includes a stage for supporting the wafer, an illumination system for imaging spatially patterned radiation onto the wafer, a positioning system for adjusting the position of the stage relative to the imaged radiation, and the aforementioned interferometry system for monitoring the position of the wafer relative to the imaged radiation.

In a further aspect, the invention features a lithography system for use in fabricating integrated circuits on a wafer, the system includes a stage for supporting the wafer, and an illumination system including a radiation source, a mask, a positioning system, a lens assembly, and the aforementioned interferometry system. During operation of the lithography system, the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

In another aspect, the invention features a beam writing system for use in fabricating a lithography mask, the system including a source providing a write beam to pattern a substrate, a stage supporting the substrate, a beam directing assembly for delivering the write beam to the substrate, a positioning system for positioning the stage and beam directing assembly relative one another, and the aforementioned interferometry system for monitoring the position of the stage relative to the beam directing assembly.

Embodiments of the invention may include any of the following advantages.

They can provide accurate interferometry measurements in the presence of time-varying optical properties of gas in the measurement and/or reference beam(s) using single wavelength interferometry techniques (i.e., non-dispersive interferometry techniques). They can compensate for optical effects of composition changes of the gas without monitoring gas composition. Similarly, they can compensate for optical effects of variations of the thermodynamic properties of the gas, such as temperature and pressure along the measurement path, without monitoring the thermodynamic properties.

They may provide a non-dispersive method and apparatus for measuring and compensation for time-varying effects of gas in a measurement path on linear and angular displacements where the refractive index may be fluctuating and/or the physical length of the measurement path may be changing. Embodiments where the physical length of the measurement path may be changing include, for example, implementations where an interferometry system is used to monitor the position of a moving wafer stage in a photolithography system.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF DRAWINGS

The invention will now be further described by way of example with reference to the accompanying drawings in which.

DETAILED DESCRIPTION

Interferometry systems can provide highly accurate measurements. Such systems can be especially useful in lithography applications used in fabricating large scale integrated circuits such as computer chips and the like. Lithography is a key technology driver for the semiconductor manufacturing industry. In lithography, overlay improvement is one of the five most difficult challenges down to and below 100 nm line widths (design rules), see, for example, the *Semiconductor Industry Roadmap*, p.82 (1997). For a general reference on lithography, see also, for example, J. R. Sheats and B. W. Smith, in *Microlithography: Science and Technology* (Marcel Dekker, Inc., New York, 1998), the contents of which is incorporated herein by reference.

Overlay depends directly on the performance, i.e., accuracy and precision, of the distance measuring interferometers used to position the wafer and reticle (or mask) stages. Since a lithography tool may produce $50–100M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

Figure 1:
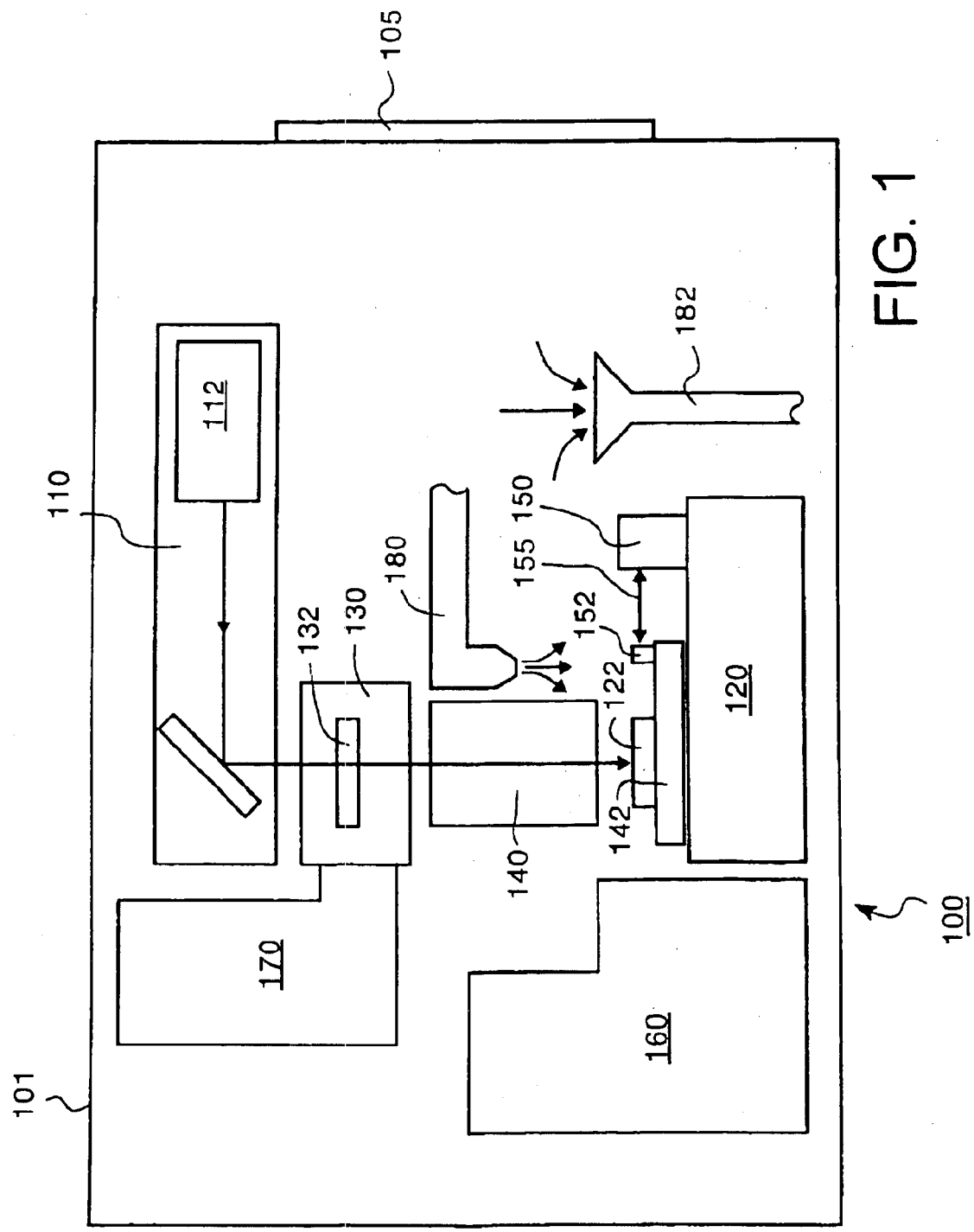
FIG. 1 is a schematic diagram of a photolithography system that includes an interferometry system.

Referring to FIG. 1, a lithography system 100, also referred to as an exposure system, typically includes an illumination system 110 and a wafer positioning system 120, and a reticle stage 130. Illumination system 110 includes a radiation source 112 for providing radiation such as ultraviolet, visible, x-ray, electron, or ion radiation. Reticle stage 130 supports a patterned reticle 132, which is also referred to as a mask. These terms are used interchangeably below. Reticle 132 imparts a pattern to radiation from illumination system 110, thereby generating the spatially patterned radiation. For the case of reduction lithography, lithography system 100 also includes a reduction lens 140 for imaging the spatially patterned radiation onto a wafer 122. Wafer positioning system 120 includes a wafer stage 142 that positions and supports wafer 122 during the exposure. Wafer positioning system 120 can also include, e.g., piezoelectric transducer elements and corresponding control electronics. The imaged radiation exposes resist coated onto the wafer. The radiation initiates photo-chemical processes in the resist that convert the radiation pattern into a latent image within the resist.

In embodiments that use proximity printing, as opposed to those implementing reduction lithography, the scattered radiation propagates a small distance (typically on the order of microns) before contacting the wafer to produce a 1:1 image of the reticle pattern.

Lithography system 100 also includes a wafer feeding system 160 and a reticle changer 170. Wafer feeding system 160 is supplied with a batch of wafers and automatically loads wafers on the wafer stage and removes wafers once they have been exposed. Reticle changer 170 selects the appropriate reticle for each exposure and positions the selected reticle on reticle stage 130.

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, the translatable wafer stage supporting the photoresist-coated wafer moves the wafer so that the radiation exposes the correct location of the wafer.

Lithography system 100 is enclosed in a chamber 101, which allow the wafer's environment to be controlled during exposure. An access port 105 provides access to the exposure apparatus, wafer feeding system and reticle chamber. Chamber 101 also includes a gas inlet 180 and a gas exhaust 182 for introducing and removing processes gas(es) into and out of the chamber, respectively. Chamber 101 helps to reduce contaminants (e.g., dust or undesirable gases), which may scatter and/or absorb the exposing radiation and degrade the light pattern at the wafer. The chamber also allows control over the composition of the atmosphere adjacent the wafer. This is especially important when the exposing radiation is strongly absorbed or scattered by air. UV radiation, for example, is strongly absorbed by oxygen, making oxygen-rich atmospheres, such as air, undesirable for UV systems. Typically, an enclosed lithography system will be flushed with nitrogen, or some other gas or gas mixture more suitable for the exposing radiation wavelength.

Lithography system 100 also includes an interferometry system that precisely measures the position of the wafer in the lithography system. The interferometry system includes an interferometer 150 and a measurement object 152. Interferometer 150 is attached to wafer positioning system 120 and measurement object 152 is attached to wafer stage 142. Measurement object 152 includes, e.g., a plane mirror for reflecting a measurement beam 155 directed to the stage by interferometer 150. The measurement beam reflects back to the interferometer 150.

In other embodiments of the lithography system, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithography system can include what is known in the art as a column reference. In such embodiments, the interferometer 150 directs the reference beam (not shown) along an external reference path that contacts a reference mirror (not shown) mounted on some structure that directs the radiation beam, e.g., reduction lens 140. The reference mirror reflects the reference beam back to the interferometry system. The interference signal produced by the interferometry system when combining measurement beam 155 reflected from measurement object 152 and the reference beam reflected from a reference mirror mounted on the reduction lens 140 indicates changes in the position of the stage relative to the radiation beam.

An example of a suitable interferometry system is described below. Although not included in the described embodiment, one or more interferometry systems can also be used to precisely measure the position of the reticle stage as well as other movable elements whose position must be accurately monitored in processes for fabricating lithographic structures (see supra, Sheats and Smith, *Microlithography: Science and Technology*).

In general, interferometry systems can be used to precisely measure the positions of each of the wafer stage and reticle stage relative to other components of the exposure system, such as the lens assembly, radiation source, or support structure. In such cases, as in the described embodiment, the interferometer is attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 2A:
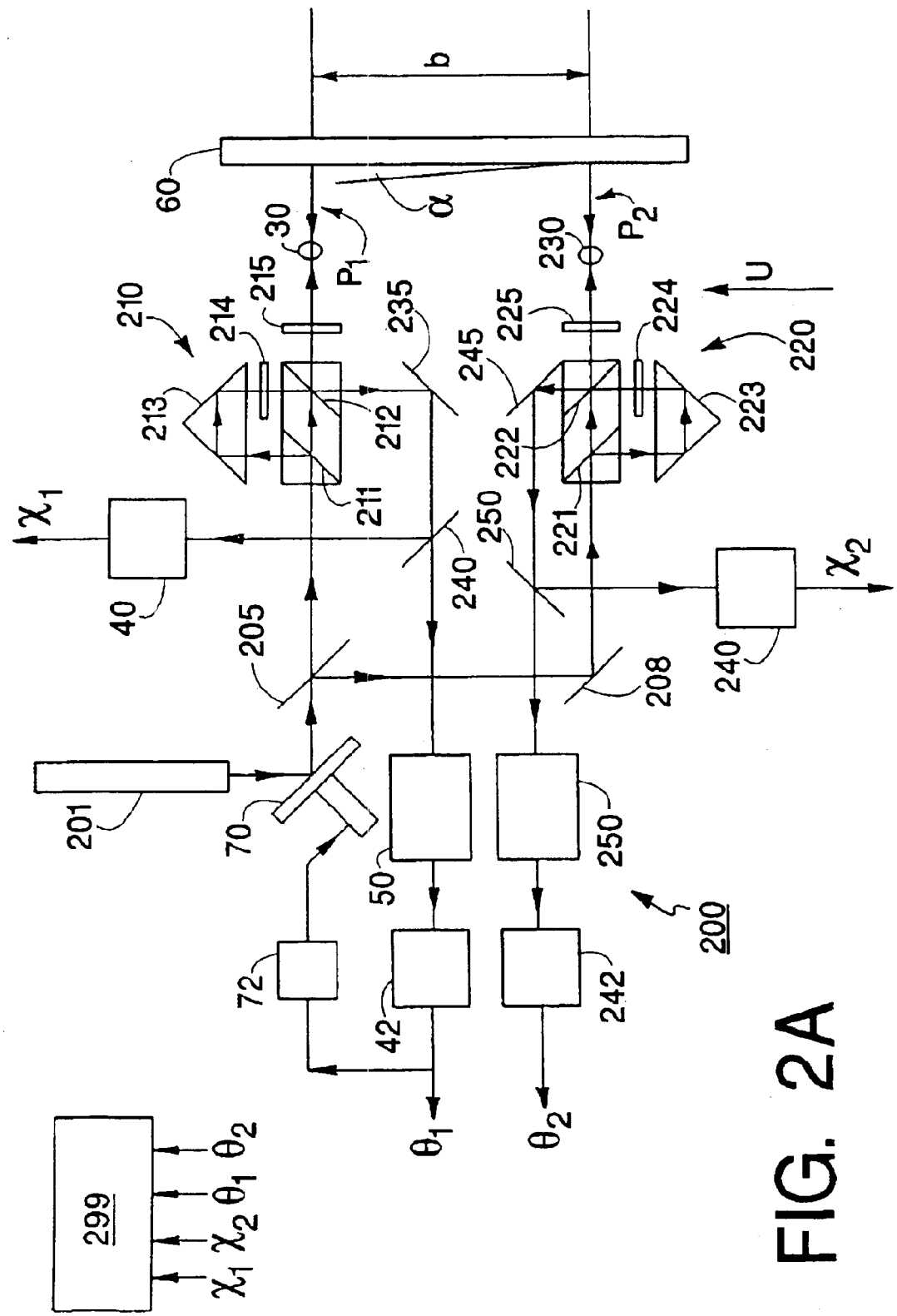
FIG. 2A is a schematic diagram of an interferometry system.

An embodiment of an interferometry system 200 is shown schematically in FIG. 2A and includes two zero-shear single-pass interferometers, indicated generally as 210 and 220. The operation of zero-shear single-pass interferometers 210 and 220 having a dynamic beam steering element 70 is described in commonly-owned, provisional patent application No. 60/314,570 by Henry A. Hill and filed Aug. 23, 2001, and is summarized briefly below. The zero-shear single-pass interferometers have a common plane mirror measurement object 60. In other embodiments, other forms of single-pass interferometers, including other forms of zero-shear single-pass interferometers, may be incorporated into the interferometry system such as those described in commonly owned, provisional patent applications 60/309, 608 and 60/314,345 both by Henry A. Hill and filed Aug. 2, 2001 and Aug. 23, 2001, respectively, the contents of which are incorporated herein by reference.

Interferometer 210 includes a pair of polarizing beam splitters, 211 and 212, a retroreflector 213, a half waveplate 214, and a quarter waveplate 215. Similarly, interferometer 220 includes polarizing beam splitters, 221 and 222, a retroreflector 223, a half-waveplate 224, ad a quarter waveplate 225.

During operation of the interferometry system, a source 201 directs an input beam towards polarizing beam splitter 211, which splits the beam into a measurement beam 30 and a reference beam having orthogonal polarization to measurement beam 30. The measurement beam is the portion of the input beam transmitted by polarizing beam splitter 211. Polarizing beam splitter 212 transmits measurement beam 30, which reflects from plane mirror object 60 back towards polarizing beam splitters 211 and 212. Quarter waveplate 214 converts the plane polarized measurement beam exiting beam splitter 212 into circularly polarized light. Similarly, quarter waveplate 214 converts the circularly polarized measurement beam reflected from plane mirror object 60 back into plane polarized light. Due to measurement beam 30 reflecting from plane mirror object 60, the plane of polarization of the reflected measurement beam is orthogonal to its original plane of polarization, so the reflected measurement beam is reflected by polarizing beam splitter 212 towards mirror 235.

Polarizing beam splitter 211 reflects the component of the input beam orthogonal to the measurement beam towards retroreflector 213. This component forms the reference beam. Retroreflector 213 directs the reference beam through half wave plate 214 towards polarizing beam splitter 212. Half wave plate 214 rotates the plane of polarization of the reference beam by 90°, so that it is transmitted by polarizing beam splitter 212. The reference beam exits interferometer 210 overlapping with the measurement beam.

The overlapping measurement and reference beam form an output beam, which is directed by mirror 235 to angular displacement interferometer 50 and a detector 42. Angular displacement interferometer 50 measure changes in the direction of propagation of measurement beam 30. An embodiment of a suitable angular displacement interferometer is described below. In addition, a beam splitter 240 directs a portion of the output beam to a detector 40, which measures a linear displacement, which corresponds to an optical path length between interferometer 210 and plane mirror object 60.

Interferometer 220 operates similarly to interferometer 210. A beam splitter 205 and a mirror 208 direct a portion of the input beam towards interferometer 220. Interferometer 220 splits the input beam into a reference beam and a measurement beam 230, and, after reflecting measurement beam 230 from plane mirror object 60, overlaps the beams as an output beam. Mirror 245 and beam splitter 250 direct a portion of the output beam to angle displacement interferometer 250 and a detector 242, and another portion to detector 240, which respectively measure changes in the direction of propagation of measurement beams 230 and a linear displacement corresponding to an optical path length between interferometer 220 and plane mirror object 60.

In addition, interferometry system 200 includes a common, dynamic beam steering element 70. Beam steering element 70 is servo-ed to the orientation of plane mirror object 60 to maintain measurement beams 30 and 230 normal to the surface of the measurement object over the range of angular orientations of the stage on which the measurement object is mounted relative to the structure supporting the interferometers. In the present embodiment, the dynamic beam steering element is responsive to a servo signal derived from detector 42, which detects an output beam from angular displacement interferometer 50. Dynamic element 70 and its general use in interferometry systems are disclosed in commonly owned U.S. Pat. Nos. 6,271,923 and 6,313,876 issued Aug. 7, 2001 and Nov. 6, 2001, respectively, the contents of which are incorporated herein by reference. Dynamic beam steering element 70 can reduce errors associated with beam shear in the system. In other embodiments, alternative or additional components/methods can be used to reduce these errors. Examples include using high-stability plane mirror interferometers (HSPMI's) instead of single-pass interferometers. An embodiment of an HSPMI is described below.

Interferometry system 200 also includes an electronic processor 299, which is connected to detectors 40, 42, 240, and 242. Electronic processor 299 receives electrical signals from these detectors, and processes them according to one or more algorithms to determine the position and orientation of plane mirror object 60. The electronic processor also compensates the measured position and orientation for time-varying effects of gas in the measurement beam paths based on the relationship derived below.

Interferometer 210, with measurement beam 30, measures a linear displacement $x_1$ and an angular displacement $\theta_1$ at a first position on plane mirror object 60 and interferometer 220, with measurement beam 230, measures a linear displacement $x_2$ and an angular displacement $\theta_2$ at a second position on plane mirror object 60 (see FIG. 2A). The linear displacements $x_1$ and $x_2$ correspond to an optical path lengths between the interferometers 210 and 220 and the first and second positions on plane mirror object 60, respectively. The linear displacements can each be written as the sum of two terms wherein one of the two terms includes the time-varying optical properties of gas in the respective measurement paths. Accordingly, $$x_1 = x_{1,0} + x_{1,T}, \quad (1)$$

$$x_2 = x_{2,0} + x_{2,T}, \quad (2)$$

where $$x_{1,T} = \int_{p1} (n-1) ds; \quad (3)$$

$$x_{2,T} = \int_{p2} (n-1) ds; \quad (4)$$

$x_{1,0}$ and $x_{2,0}$ are the physical displacements of plane mirror object 60 at the first and second positions, respectively; $x_{1,T}$ and $x_{2,T}$ are the respective contributions of the gas to the linear displacements $x_1$ and $x_2$ of plane mirror object 60; n is the refractive index of the gas at wavelength $\lambda$; $\lambda$ is the wavelength of the input beam to the interferometer assembly; and ds is an infinitesimal path length along a respective optical paths $p_1$ and $p_2$ of measurement beams 30 and 230, respectively. Optical paths p1 and p2 are indicated on FIG. 2A.

Each of the angular displacements $\theta_1$ and $\theta_2$ can also be written as the sum of two terms wherein one of the two terms comprises the time-varying effects of the gas in the respective measurement paths. Accordingly $$\theta_1 = \alpha + \theta_{1,T}, \quad (5)$$

$$\theta_2 = \alpha + \theta_{2,T}, \quad (6)$$

where $$\theta_{1,T} = \int_{p1} \left(\frac{\partial n}{\partial r}\right) ds \quad (7)$$

$$= \int_{p1} \left[\frac{\partial (n-1)}{\partial r}\right] ds;$$

$$\theta_{2,T} = \int_{p2} \left(\frac{\partial n}{\partial r}\right) ds \quad (8)$$

$$= \int_{p2} \left[\frac{\partial (n-1)}{\partial r}\right] ds;$$

$\alpha$ is the angular displacement of plane mirror object 60 (see FIG. 2A); $(\partial n/\partial r)$ is the partial derivative of the refractive index n with respect to r; and r is a coordinate locally orthogonal to a curvilinear optical path s in the plane of FIG. 2A. The effects of gradients in the refractive index on the direction of propagation of a beam are described for example in an article entitled "Compensation for the Lateral Color Aberration Produced by the Atmosphere" by H. A. Hill and C. A. Zanoni, *JOSA* 56, 1655–1659 (1966).

An independent value for angular displacement $\alpha$ is obtained from the difference of measured linear displacements $x_1$ and $x_2$. Using Equations (1) and (2), the independent value for $\alpha$ can be written as $$\alpha = \frac{x_2 - x_1}{b} - \left(\frac{1}{b}\right)\left[\int_{p2} (n-1) ds - \int_{p1} (n-1) ds\right] \quad (9)$$

where b is the separation of beams 30 and 230 at plane mirror object 60 (see FIG. 2A). The difference of the measured angular displacements of $\theta_1$ and $\theta_2$ can be written using Equations (5)–(8) as $$\theta_2 - \theta_1 = \int_{p2}\left[\frac{\partial (n-1)}{\partial r}\right] ds - \int_{p1}\left[\frac{\partial (n-1)}{\partial r}\right] ds. \quad (10)$$

The second term on the right hand side of Equation (9) is related to the right hand side of Equation (10) by a spatial integration. Consequently, the difference $\theta_2 - \theta_1$ can be used to correct for the effect of the second term to yield a measured value of $\alpha$ compensated for the effects of time-varying effects of the gas.

The integration of $(\theta_2 - \theta_1)$ with respect to time t is $$\int (\theta_2 - \theta_1) dt = \int dt \int_{p2}\left[\frac{\partial (n-1)}{\partial r}\right] ds - \int dt \int_{p1}\left[\frac{\partial (n-1)}{\partial r}\right] ds. \quad (11)$$

The order of integration with respect to t and s may be inverted to a good approximation in Equation (11) to obtain $$\int (\theta_2 - \theta_1) dt = \int ds \int_{p2}\left[\frac{\partial (n-1)}{\partial r}\right] dt - \int ds \int_{p1}\left[\frac{\partial (n-1)}{\partial r}\right] dt. \quad (12)$$

The rate at which gas refractivity in the measurement beam paths change is proportional to the component of the gas velocity perpendicular to the measurement beam paths in the plane of FIG. 2A. Therefore, for a non-zero gas flow with a velocity component u in the plane of FIG. 2A and perpendicular to the measurement beam paths, the temporal integration Equation (12) can be transformed into a spatial integration with the result $$\int (\theta_2 - \theta_1) dt = \quad (13)$$

$$\left(\frac{1}{u}\right)\left\{\int ds \int_{p2}\left[\frac{\partial (n-1)}{\partial r}\right] dr - \int ds \int_{p1}\left[\frac{\partial (n-1)}{\partial r}\right] dr\right\}$$

$$= \left(\frac{1}{u}\right)\left[\int_{p2} (n-1) ds - \int_{p1} (n-1) ds\right].$$

The velocity component u can be determined in a number of ways. For example, gas velocity can be monitored empirically using one or more gas flow meters. Information from the gas flow meter(s) can be input to the electronic processor and used to compensate the optical path length measurement in real time. Where the interferometry system is used in environments which repeat gas flow patterns cyclically, such as in lithography systems, empirical gas velocity data for, e.g., a single exposure cycle can be used for subsequent cycles, removing the need for constant gas monitoring.

Alternatively, or additionally, gas velocity data can be determined using computational methods. An example of a computational method is to determine the gas velocity using commercial computational fluid dynamics programs. One example of such a program is Star CD, available from the CD adapco Group (Melville, N.Y.). In general, computational fluid dynamics solve fluid dynamics problems in complex systems by solving one or more sets of differential equations relating parameters of the fluid (e.g., density, temperature) at a set of discrete locations and times within the system. For example, for an incompressible fluid, one might use the Navier-Stokes equation, which is the fundamental partial differential equation that describes the flow of such fluids. The set of discrete locations, often referred to as a mesh, is usually defined according to the physical structure of the system. The differential equation(s) usually requires a set of user-defined boundary values describing, e.g., initial system conditions to be entered prior to solving. These can include boundary conditions for any parameter, such as an initial temperature profile, or the temperature of certain portions of the mesh at particular times during a cycle. Accordingly, by determining an appropriate mesh and entering conditions for the exposure cycle, one can computationally determine values of the gas velocity and/or other parameters at different locations in the chamber during the cycle.

Gas velocity data can also be determined based on the interferometry measurements themselves. Measured values $x_1$, $\theta_1$, $x_2$, and $\theta_2$, for example, each have a component that depends on time-varying effects of the gas. Accordingly, the rate of change of $(x_2-x_1)$ and the time integral Of $(\theta_2-\theta_1)$ will have a component that depends on the changes of gas refi-activity due to, for example, the gas turbulence. Thus, the component of $(x_2-x_1)$ and the time integral of $(\theta_2-\theta_1)$ related to changes in the gas will be correlated. Therefore, a velocity component u can be selected as the value that provides the best correlation coefficient between $(x_2-x_1)$ and the time integral Of $(\theta_2-\theta_1)$.

Because Equation (13) includes a (1/u) term, the velocity component u should be non-zero for the described compensation technique to provide accurate results. Accordingly, the interferometry system should be positioned in the lithography system with the measurement beam path non-parallel to the gas flow direction.

The following equation for α compensated of time-varying effects of the gas is obtained by combining Equations (9) and (13):

$$\alpha = \frac{x_2 - x_1}{b} - \left(\frac{u}{b}\right) \int (\theta_2 - \theta_1) dt. \tag{14}$$

The angular displacement α compensated of time-varying effects of the gas is used as a signal by servo controller 72 to control the orientation of dynamic beam steering element 70 in the plane of FIG. 2A.

Next, the measured value of α given by Equation (14) is used in Equation (5) to obtain the time-varying effects $\theta_{1,T}$ of the gas on the direction of propagation of beam 30, i.e.

$$\theta_{1,T} = \theta_1 - \left[\frac{x_2 - x_1}{b} - \left(\frac{u}{b}\right) \int (\theta_2 - \theta_1) dt\right]. \tag{15}$$

A subsequent integration of Equation (15) with respect to t, a change in order of integration, and changing the integration with respect to t to an integration with respect to r gives to a good approximation the time-varying effects of the gas on the measured optical path length of beam 30, i.e.

$$x_{1,T} = u \int \left\{\theta_1 - \left[\frac{x_2 - x_1}{b} - \left(\frac{u}{b}\right) \int (\theta_2 - \theta_1) dt\right]\right\} dt. \tag{16}$$

The following equation for $x_{1,0}$ compensated of time-varying effects of the gas is obtained by combining Equations (1) and (16), $$x_{1,0} = x_1 - u \int \left\{\theta_1 - \left[\frac{x_2 - x_1}{b} - \left(\frac{u}{b}\right) \int (\theta_2 - \theta_1) dt\right]\right\} dt. \tag{17}$$

It will be evident to those skilled in the art that a measurement of $x_{2,0}$ compensated of time-varying effects of the gas can be obtained by a data processing analogous to that for the determination of $x_{1,0}$.

Note that the measured values for $x_{1,0}$ and α are compensated for the time-varying effects of gas turbulence, time-varying changes in a uniform or non-uniform gas composition, and time-varying changes in thermodynamic properties of the gas along the optical paths of beams 30 and 230.

In embodiments, the integrand in Eq. (17) can include a weighting function to prevent the integral from diverging, e.g., due to noise. The form of the weighting function can vary. One example of a weighting function is a step function (e.g., equal to one for measurements made within a cutoff time from the present time, and equal to zero for measurements made prior to the cutoff time.) Other examples include exponential or geometrically decaying functions that weight the most recent measurements more heavily than measurements made longer ago.

The time increment between measurements should be less than about (u/b), which is the amount of time taken for a parcel of gas to traverse the space between the measurement beams.

The compensation procedure of the described embodiment can be adapted to compensate for the time-varying effects of a gas that has a non-isotropic gas flow pattern. Non-isotropic flow patterns include those in which the gas velocity differs along different portions of the measurement beam paths. For the adapted compensation procedure, the measured values of respective quantities are first Fourier transformed to frequency space and portions of the frequency spectra associated with a flow velocity component $u_i$ for i=1,2, . . . . The portions are then inverse Fourier transformed and subsequently processed according to Equations (15) and (17)with associated $u_i$ for compensation for the time-varying effects of a gas that has a non-isotropic gas flow pattern.

For applications that include measurement of changes of orientation of plane mirror object 60 in a plane orthogonal to the plane of FIG. 2A that are compensated for time-varying effects of the gas, a third zero-shear single-pass interferometer and additional angular displacement interferometers are added to the interferometer assembly of the first embodiment to form a modified interferometer assembly. The third zero-shear single-pass interferometer and additional angular displacement interferometers are added to the interferometer assembly to measure angular displacements of plane mirror object 60 in a plane orthogonal to the plane of FIG. 2A. The description of the processing of information obtained by the modified interferometer assembly is the same as corresponding portions of the description given for the first embodiment for measurement of changes in orientation of plane mirror object 60 orthogonal to the plane of FIG. 2A that are compensated for time-varying effects of the gas.

Figure 2B:
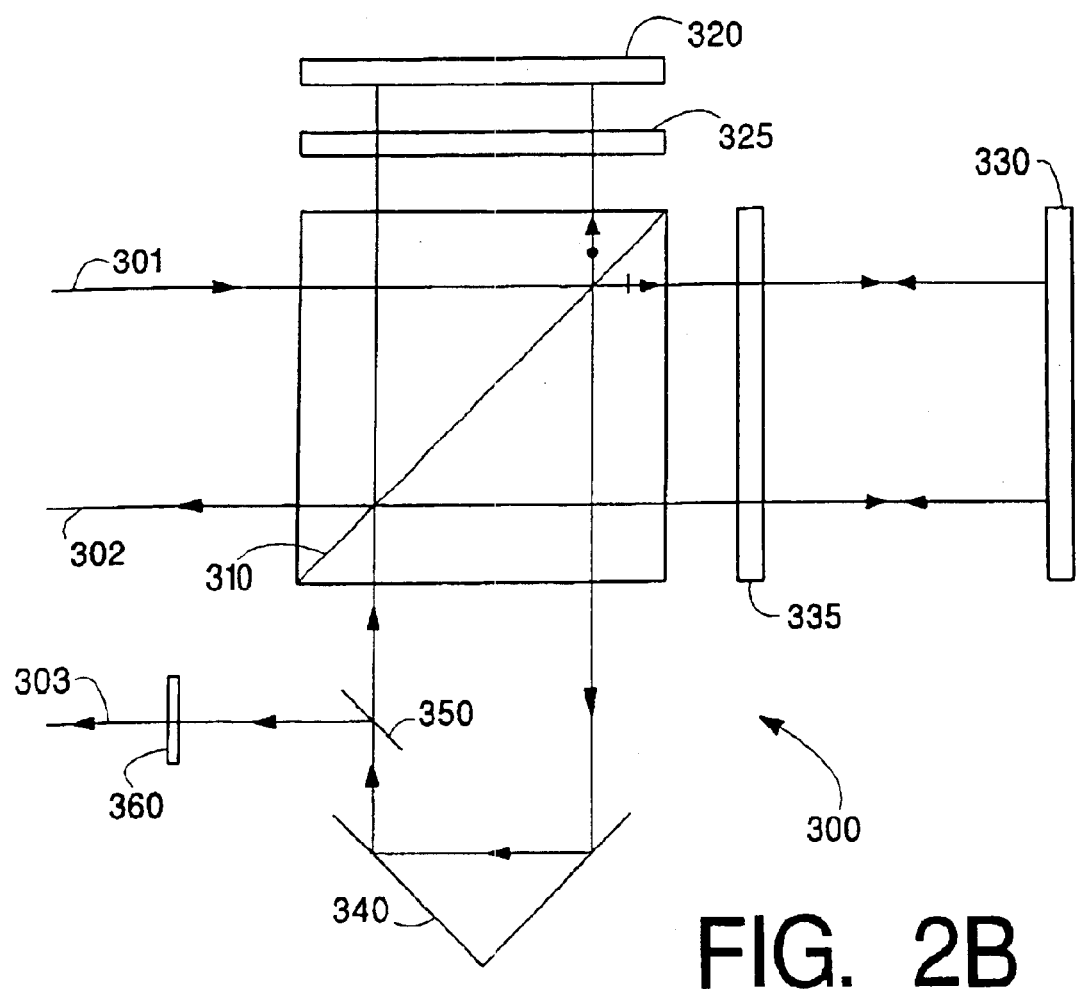
FIG. 2B is a schematic diagram of a high-stability plane mirror interferometer (HSPMI).

Although system 200 includes single-pass interferometers, other embodiments can include interferometers in which the measurement beam contacts the measurement object more than once. For example, in some embodiments, the interferometry system can includes a high-stability plane mirror interferometer (HSPMI). An example of an HSPMI 300 is shown in FIG. 2B. HSPMI 300 includes a polarizing beam splitter (PBS) 310, a reference mirror 320, a plane mirror measurement object 330, and a retroreflector 340. PBS 310 splits an input beam 301 into a reference beam and a measurement beam, the reference beam polarization being orthogonal to the measurement beam polarization. Reference mirror 320 reflects the measurement beam. A quarter waveplate 325 positioned between PBS 310 and reference mirror 320 causes the once reflected reference beam to have orthogonal polarization to the beam's initial polarization state. Accordingly, the once reflected reference beam is transmitted by PBS 310. Retroreflector 340 directs the reference beam back towards reference mirror 320. The second reflection and double pass through quarter wave plate 325 restores the reference beam polarization to its original state. Subsequently, PBS 310 reflects the reference beam, which exits the interferometer as a component of output beam 302.

The path of the measurement beam is analogous to that of the reference beam. PBS initially transmits the measurement beam through to plane mirror measurement object 330. Retardation due to a quarter wave plate 335 and reflection from measurement object 330 transform the measurement beams polarization state to a state orthogonal to its original polarization state. Thus, the reflected measurement beam is now reflected by PBS 310 to retroreflector 340. Subsequently, PBS 310 directs the measurement beam back towards measurement object 330, before the measurement beam, now twice-reflected by the measurement object, exits the interferometer as a component of output beam 302.

Due to the double pass to the measurement object, the output beam is parallel to the input beam, even in the absence of a dynamic beam steering element to compensate for variations in the orientation of the measurement object. Due to the insensitivity of the propagation direction of output beam 302 to variations in the orientation of measurement object 330, information about these variations is not carried by output beam 302. Accordingly, interferometer 300 includes a non-polarizing beam splitter 350 that directs a second output beam 303 to an angular displacement interferometer. Second output beam 303 includes a measurement beam component that has only contacted measurement object 330 once and therefore still contains information about the orientation of the measurement object. However, the path of the reference beam component of the output beam is unaffected by variations in the orientation of measurement object 330. Therefore, in the present embodiment, the reference beam component of second output beam 303 is removed by a polarizer 360 (e.g., an absorptive sheet polarizer or a polarizing beam splitter), prior to the angular displacement interferometer. Accordingly, the beam propagation direction measurement is made using only the measurement beam component. Alternatively, the angular displacement interferometer could be replaced with a differential angular displacement interferometer, which measures variations in a difference between the propagation directions of a measurement and reference beam components in an output beam. In such embodiments, the beam propagation direction measurement can be made using both the measurement and reference beam components of second output beam 303. Examples of differential angular displacement interferometers are described in U.S. patent application Ser. No. 10/272,034 by Henry A. Hill, filed Oct. 15, 2002 and entitled "INTERFEROMETER FOR MEASURING CHANGES IN OPTICAL BEAM DIRECTIONS".

In other embodiments, the system can include interferometers that direct the measurement beam to contact the measurement object more than twice.

Figure 3:
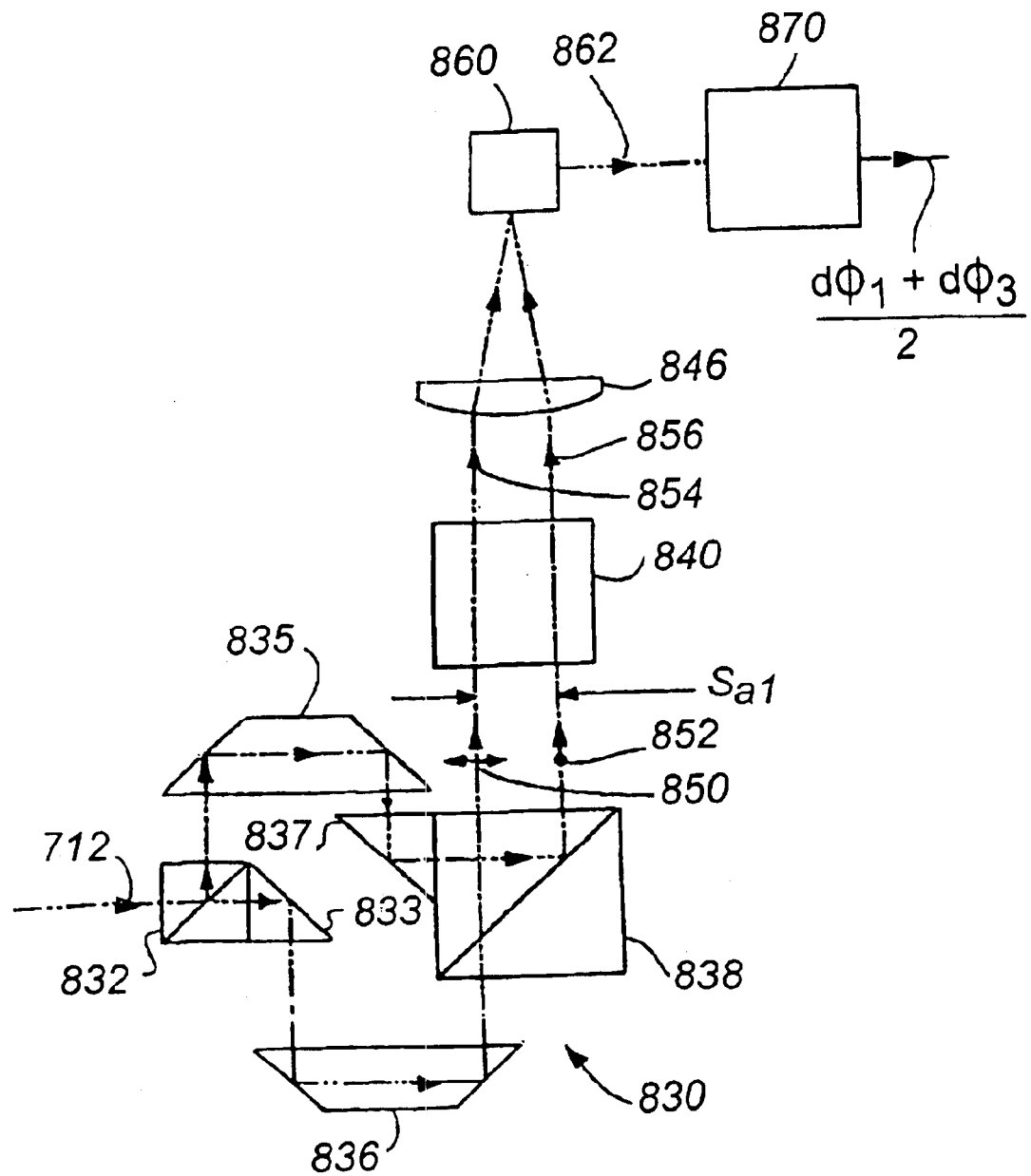
FIG. 3 is a schematic diagram of an embodiment of an angular displacement interferometer.

Referring now to FIG. 3, an embodiment of an angle interferometer is shown schematically and makes angle measurements in one plane of the average direction of propagation of beam 712 relative to a predefined optical axis. The first embodiment comprises beam-shearing assembly generally shown at element numeral 830, analyzer 840, lens 846, detector 860, and electronic processor 870. For heterodyne interferometry, input beam 712 comprises two orthogonally polarized optical beam components having a difference in frequencies of $f_1$. The planes of polarization of the two orthogonally polarized components are parallel and orthogonal to the plane of FIG. 3, respectively.

Beam-shearing assembly 830 introduces a lateral shear $S_{a1}$ between the two orthogonally polarized beams 850 and 852, respectively (see FIG. 3). A portion of each of the spatially sheared output beams 850 and 852 are transmitted by analyzer 840 as components 854 and 856, respectively. Analyzer 840 is orientated so that beam components 854 and 856 are both polarized in a common plane orientated at 45 degrees to the plane of FIG. 3.

Next, beam components 854 and 856 are incident on lens 846 wherein lens 846 focuses beam components 854 and 856 to spots on detector 860 to be detected preferably by a quantum photon detector to generate electrical interference signal 862 or heterodyne signal $s_1$. The spots substantially overlap. Heterodyne signal $s_1$ is transmitted to electronic processor 870 for determination of the heterodyne phase of signal $s_1$ and a corresponding average direction of propagation of beam 712 in the plane of FIG. 3.

Beam-shearing assembly 830 comprises polarizing beam-splitters 832 and 838, right angle prisms 833 and 837, and truncated Porro prisms 835 and 836. The component of beam 712 polarized in the plane of FIG. 3 is transmitted by polarizing beam-splitter 832, reflected by right angle prism 833, redirected by truncated Porro prism 836, and reflected by polarizing beam-splitter 838 as beam 850. The component of beam 712 polarized orthogonal to the plane of FIG. 3 is reflected by polarizing beam-splitter 832, redirected by truncated Porro prism 835, reflected by right angle prism 837, and transmitted by polarizing beam-splitter 838 as beam 852.

Note that the optical path in glass for each of beams 854 and 856 through beam-shearing assembly 830 and analyzer 840 are preferably the same. This feature of the apparatus design of the first embodiment produces a high stability interferometer system with respect to changes in temperature.

Heterodyne signal $s_1$ may be written as $$s_1 = A_1 \cos(\omega_1 t + \phi_1 + \zeta_1) \tag{18}$$

where $$\phi_1 = 2k_1 n[d_1 \cos\theta'_1 + d_2 \cos\theta'_2 - d_3 \cos\theta'_3 - d_4 \cos\theta'_4], \tag{19}$$

Figure 4:
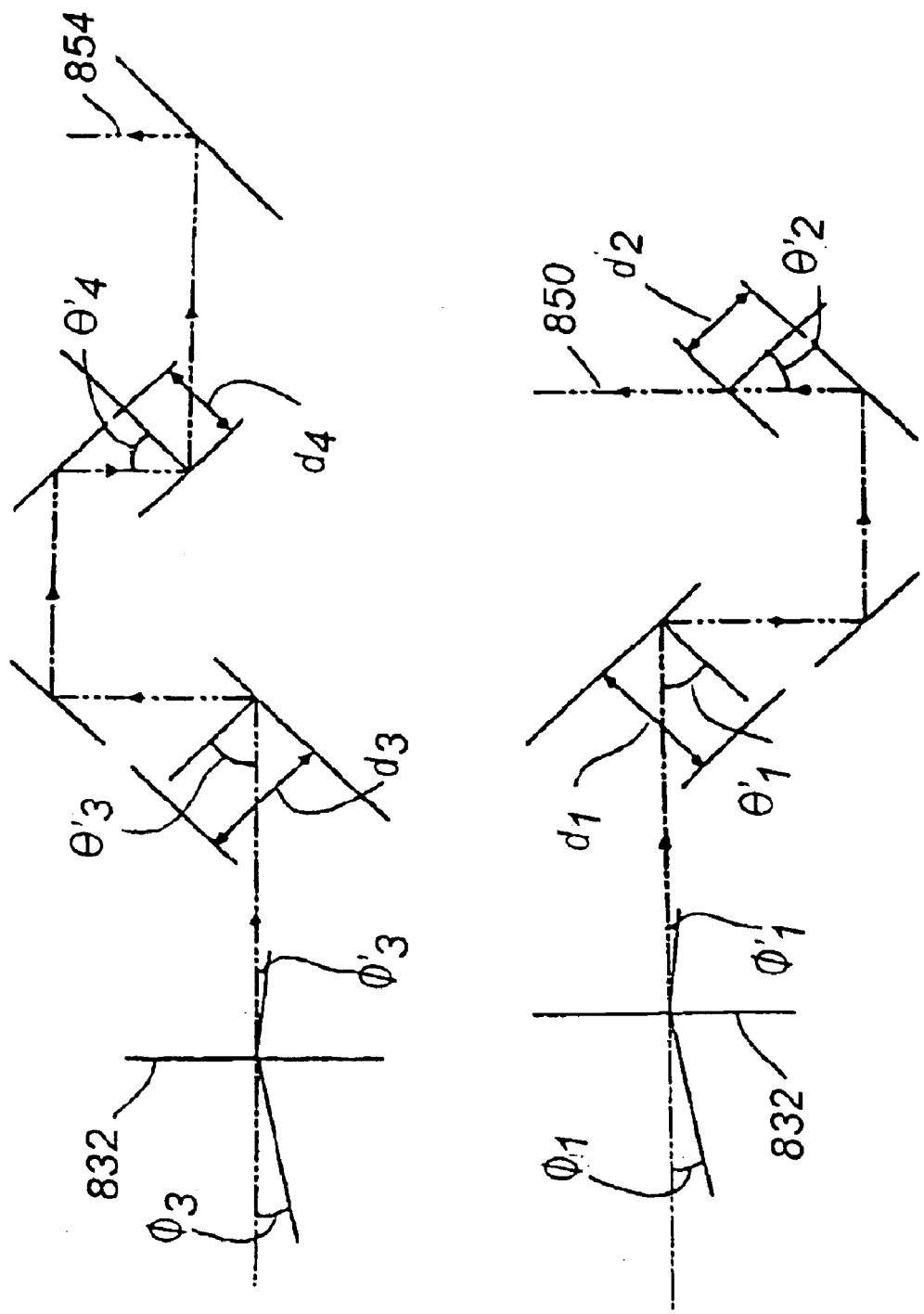
FIG. 4 is a schematic diagram showing the path of a beam through portions of the angular displacement interferometer shown in FIG. 4.

$\omega_1 = 2\pi f_1$, $\zeta_1$ is an offset phase not associated with phase $\phi_1$, $k_1 = 2\pi/\lambda_1$, $\lambda_1$ is the wave length of input beam 712, $\theta'_1$ and $\theta'_2$ are angles of incidence of beam 850 at right angle prism 833 and at the polarizing beam-splitter 838, respectively, (see FIG. 4), $\theta'_3$ and $\theta'_4$ are angles of incidence of beam 852 at polarizing beam-splitter 832 and at right angle prism 837, respectively, and $d_1$, $d_2$, $d_3$, and $d_4$ are defined in FIG. 4. It has been assumed in Eq. (19) for the purposes of demonstrating the features of the present invention in a simple fashion without departing from the scope and spirit of the present invention that all of the optical paths in beam-shearing assembly 30 have the same index of refraction. For a non-limiting example of $d_1=d_3$, $d_2=d_4$, $\theta'_1+\theta'_2=\pi/2$, and $\theta'_3+\theta'_4=\pi/2$, Eq. (19) reduces to the simpler expression for $\phi_1$, $$\varphi_1 = 2^{1/2} k_1 n \begin{bmatrix} (d_1-d_2)[\cos(\theta'_1+\pi/4)+\cos(\theta'_4+\pi/4)] + \\ (d_1+d_2)[\sin(\theta'_1+\pi/4)-\sin(\theta'_4+\pi/4)] \end{bmatrix}. \quad (20)$$

Lateral shear $S_{a1}$ is related to properties of beam-shearing assembly 830 according to the equation $$S_{a1} = 2 \begin{bmatrix} (d_1\sin\theta'_1 - d_2\sin\theta'_2)\sec\phi'_1\cos\phi_1 + \\ (d_3\sin\theta'_3 - d_4\sin\theta'_4)\sec\phi'_3\cos\phi_3 \end{bmatrix} \quad (21)$$

where $\phi_1$ and $\phi'_1$ are the angles of incidence and refraction of beam 850 at entrance facet of polarizing beam-splitter 832 and $\phi_3$ and $\phi'_3$ are the angles of incidence and refraction of beam 852 at entrance facet of polarizing beam-splitter 832 (see FIG. 4). For the non-limiting example, $$S_{a1} = 2^{1/2} \left\{ (d_1-d_2) \begin{bmatrix} \sin(\theta'_1+\pi/2)\sec\phi'_1\cos\phi_1 + \\ \sin(\theta'_4+\pi/2)\sec\phi'_3\cos\phi_3 \end{bmatrix} + (d_1+d_2) \begin{bmatrix} \sin(\theta'_1-\pi/2)\sec\phi'_1\cos\phi_1 - \\ \sin(\theta'_4-\pi/2)\sec\phi'_3\cos\phi_3 \end{bmatrix} \right\}. \quad (22)$$

The expression given for $S_{a1}$ by Eqs. (21) and (22) represent the primary mechanism used for generation of the beam shear. However, there are other mechanisms for introducing a beam shear such as associated with angle of incidence dependent phase shifts (e.g., Goos-Hänchen effect).

Figure 5:
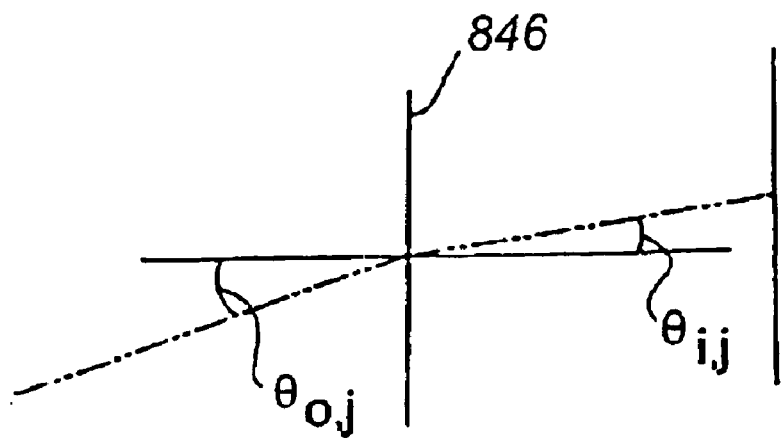
FIG. 5 and FIG. 6 are schematic diagrams showing the path of a beam through other portions of the angular displacement interferometer shown in FIG. 3.
Figure 6:
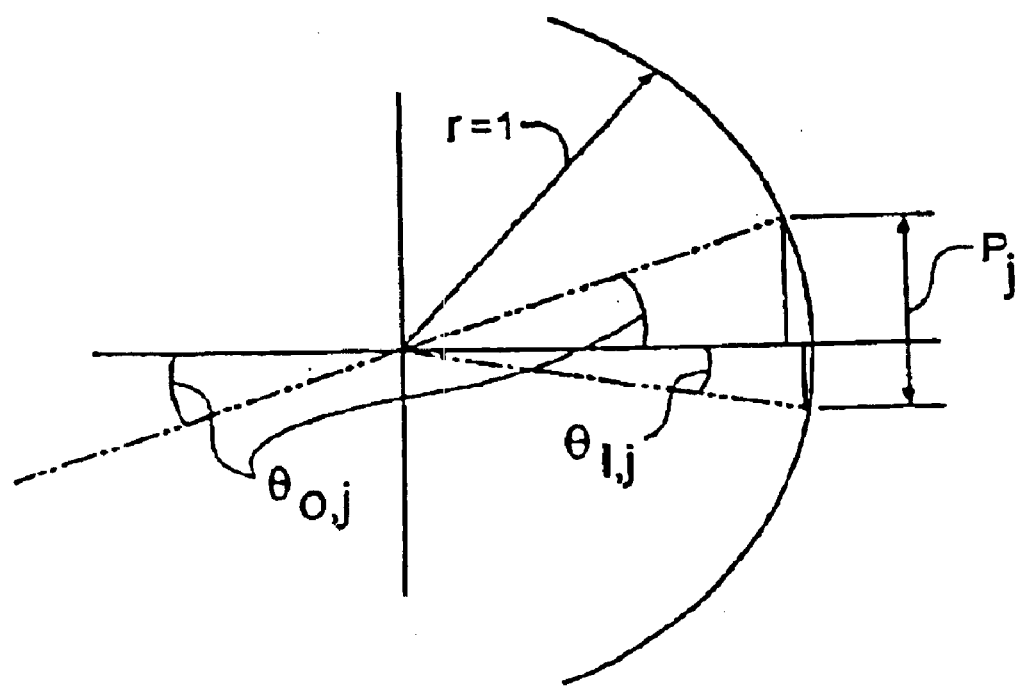

Amplitude $A_1$ is proportional to a good approximation to a Fourier component of the Fourier transform of $|h(p_1)|^2$, i.e., $$A_1 \propto \int |h(p_1)|^2 \cos[4k_1 p_1 S_1] dp_1 \quad (23)$$

where $h(p_1)$ is the Fourier transform of the amplitude of one of the beams 854 or 856 at lens 846 multiplied by the pupil function of lens 846, $$p_j = \sin\theta_{o,j} + \sin\theta_{i,j}, j=1,2\ldots, \quad (24)$$

and the definition of $\theta_{o,j}$ and $\theta_{i,j}$ are shown in FIG. 5. Angles $\theta_{o,j}$ and $\theta_{i,j}$ are conjugate angles of principle rays of beam j in the object and image space of lens 846. The definition of $p_j$ is shown in FIG. 6.

It is evident from Eqs. (19) and (20) that the resolution of phase $\phi_1$ in terms of a change in a direction of an optical beam is increased as the length $2^{3/2}(d_1-d_2)$ is increased. However, the usable range for $2^{3/2}(d_1-d_2)$ is defined by the spatial frequency bandwidth of the Fourier transform of $|h(p_1)^2|$ as shown by Eq. (23).

The optimum value for $2^{3/2}(d_1-d_2)$ is generally equal to approximately one half a characteristic spatial dimension of a beam transmitted by a respective pupil. Consider, for example, the case of a rectangular pupil of dimension b in the plane of FIG. 3 for both beam 854 and beam 856 at lens 846 and the amplitudes of beams 854 and 856 being uniform across respective pupils. For this case, $|h(p_1)|^2$ is a sinc function squared, i.e., $(\sin x/x)^2$, and the Fourier transform of $|h(p_1)|^2$ is a triangle function, $\Lambda$. Triangle function, $\Lambda$, has a maximum value of 1 for $2^{3/2}(d_1-d_2)=0$ and has a value of 0 for $2^{3/2}(d_1-d_2) \geq b$. Therefore, amplitude $A_1=0$ for $2^{3/2}(d_1-d_2) \geq b$ and the resolution of phase $\phi_1$ in terms of a change in a direction of an optical beam is 0 for $2^{3/2}(d_1-d_2)=0$. Thus the optimum value for $2^{3/2}(d_1-d_2)$ is in this case approximately b/2. The actual optimum value for $2^{3/2}(d_1-d_2)$ will depend on the criterion used to define an optimum operating condition with respect to a signal-to-noise ratio, for example. For the case where the components of beam 712 have Gaussian intensity profiles, the optimum value for $2^{3/2}(d_1-d_2)$ will be approximately w where w is the radius at which the intensity of beam 712 has a value equal to 1/e of the intensity at beam 712 at its center.

For an example of a beam having a Gaussian intensity profile with 2 w=5.0 mm, $\theta_1=45$ degrees, and $\lambda_1=633$ nm, the sensitivity of the phase $\phi_1$ to changes in $d\phi_1$ and $d\phi_3$ expressed in differential form is given by the equation $$d\varphi_1 = k_1 w \left[ \frac{d\phi_1 + d\phi_3}{2} \right] \quad (25)$$
$$= -2.5 \times 10^4 \left[ \frac{d\phi_1 + d\phi_3}{2} \right].$$

Note, as evident from Eq. (25), that the sensitivity of the change in phase $\phi_1$ with respect to changes in angles $d\phi_1$ and $d\phi_3$ is independent of the index of refraction n. This is an important property of the first embodiment of the angle interferometer. In particular, the sensitivity of the change in phase $\phi_1$ with respect to changes in angles $d\phi_1$ and $d\phi_3$ has a sensitivity to temperature changes that is independent in first order to thermal induced changes in the refractive index of the optical elements of beam-shearing assembly 830 and only dependent on thermal coefficients of expansion of the optical elements of beam-shearing assembly 830. The thermal coefficients of the elements of beam-shearing assembly 830 can be selected to be less than $\leq 0.5$ ppm/° C. For similar reasons, the zero value of $\phi_1$ also exhibits a corresponding low sensitivity to changes in temperature of beam-shearing assembly 830.

The two primary quantities that place restrictions on the range of average value $[d\phi_1+d\phi_3]/2$ that can be accommodated by the first embodiment are the magnitude of the difference $[d\phi_1-d\phi_3]/2$ and the size of the sensitive area of detector 860. The amplitude of the heterodyne signal will be reduced by a factor of approximately 2 when $$wk_1 \left[ \frac{[d\phi_1 - d\phi_3]}{2} \right] \approx 1.$$

The higher terms in $d\phi_1$ and $d\phi_3$ that are omitted in Eq. (25) can be easily determined from Eq. (19) if required for a particular end use application.

Figure 7:
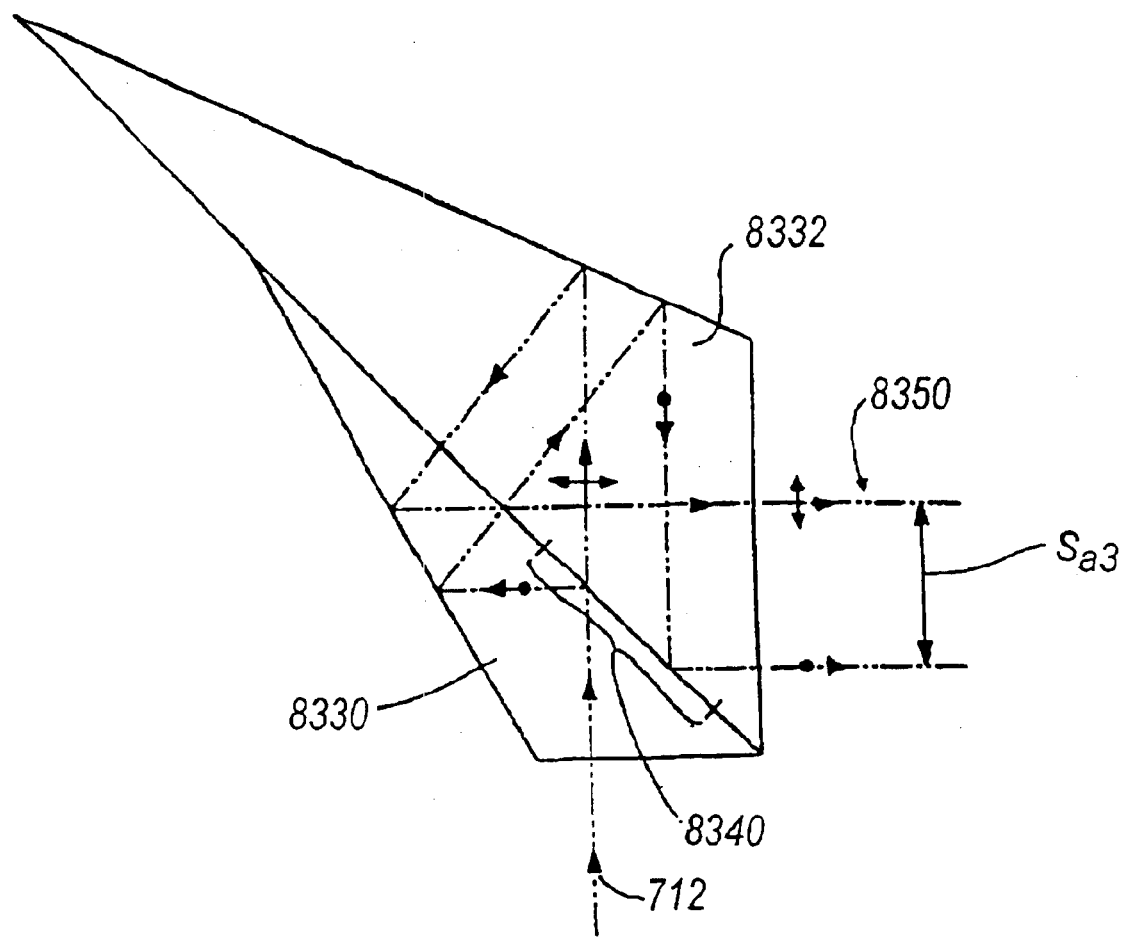
FIG. 7 is a schematic diagram of an embodiment of a beam shearing assembly.

A second embodiment of beam-shearing assembly 830 is shown diagrammatically in FIG. 7 and comprises two prisms 8330 and 8332 and polarization beam-splitter interface 8340. A first component of input beam 712 is transmitted twice by polarization beam-splitter interface 8340 and reflected by facets of prisms 8330 and 8332 to form output beam 8350. A second component of input beam 712 is reflected twice by polarization beam-splitter interface 8340 and reflected by facets of prisms 8330 and 8332 to form output beam 8352.

The two prisms 8330 and 8332 and polarization beam-splitter interface 8340 exhibit properties the same as a Penta prism with respect to relationship of the direction of propagation of beam 712 and the directions of propagation for beams 8350 and 8352. Prisms 8330 and 8332 are preferably isomorphic with relative sizes selected to introduce a beam shear $S_{a3}$ between beams 8350 and 8352. The optical paths in refractive media are substantially the same for beam 8350 and 8352. The remaining descriptions of beams 8350 and 8352 are the same as the corresponding portion of the descriptions given for beams 850 and 852 of the first embodiment with shear $S_{a1}$ replaced by shear $S_{a3}$. The description of input beam 712 in FIG. 7 is the same as the description of input beam 712 of the first embodiment shown in FIG 3.

Figure 9:
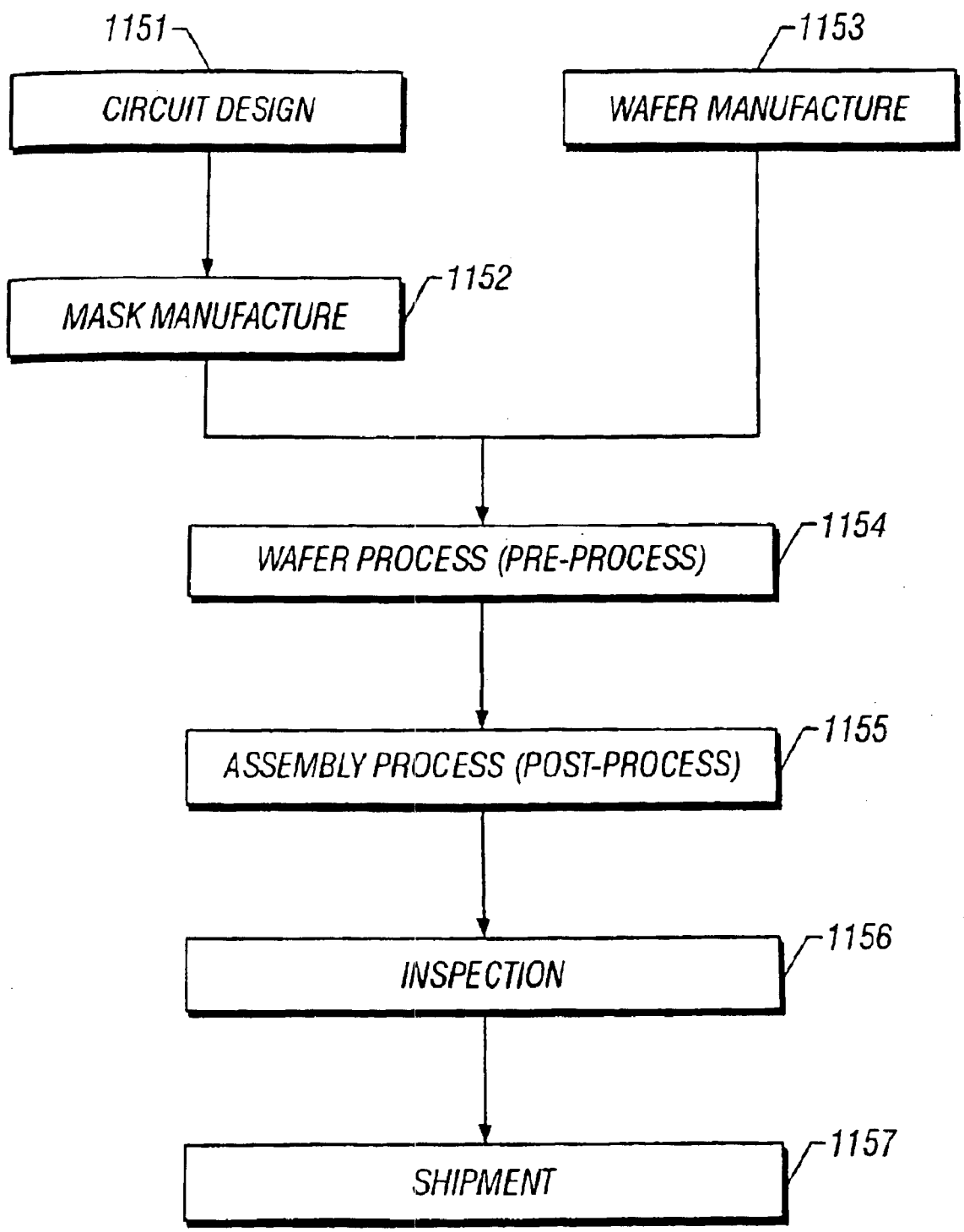
FIG. 9 and FIG. 10 are flow charts that describe steps for making integrated circuits.

Details of additional angular displacement interferometers are disclosed in PCT Publication WO 00/66969 by Henry A. Hill and published Nov. 9, 2000, the contents of which is incorporated herein by reference, and the aforementioned U.S. patent application Ser. No. 10/272,034. Furthermore, techniques described in U.S. patent application Ser. No. 10/287,898, entitled "INTERFEROMETRIC CYCLIC ERROR COMPENSATION," by Henry A. Hill, filed Nov. 5, 2002 may be incorporated into the described embodiment to compensate for cyclic errors in the output beams of the zero-shear single-pass interferometers used to determine linear and angular displacements of plane mirror object 60 without departing from the scope and spirit of the present invention As is well known in the art, lithography is a critical part of manufacturing methods for making semiconducting devices. For example, U.S. Pat. No. 5,483,343 outlines steps for such manufacturing methods. These steps are described below with reference to FIGS. 9 and 10. FIG. 9 is a flow chart of the sequence of manufacturing a semiconductor device such as a semiconductor chip (e.g., IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 10:
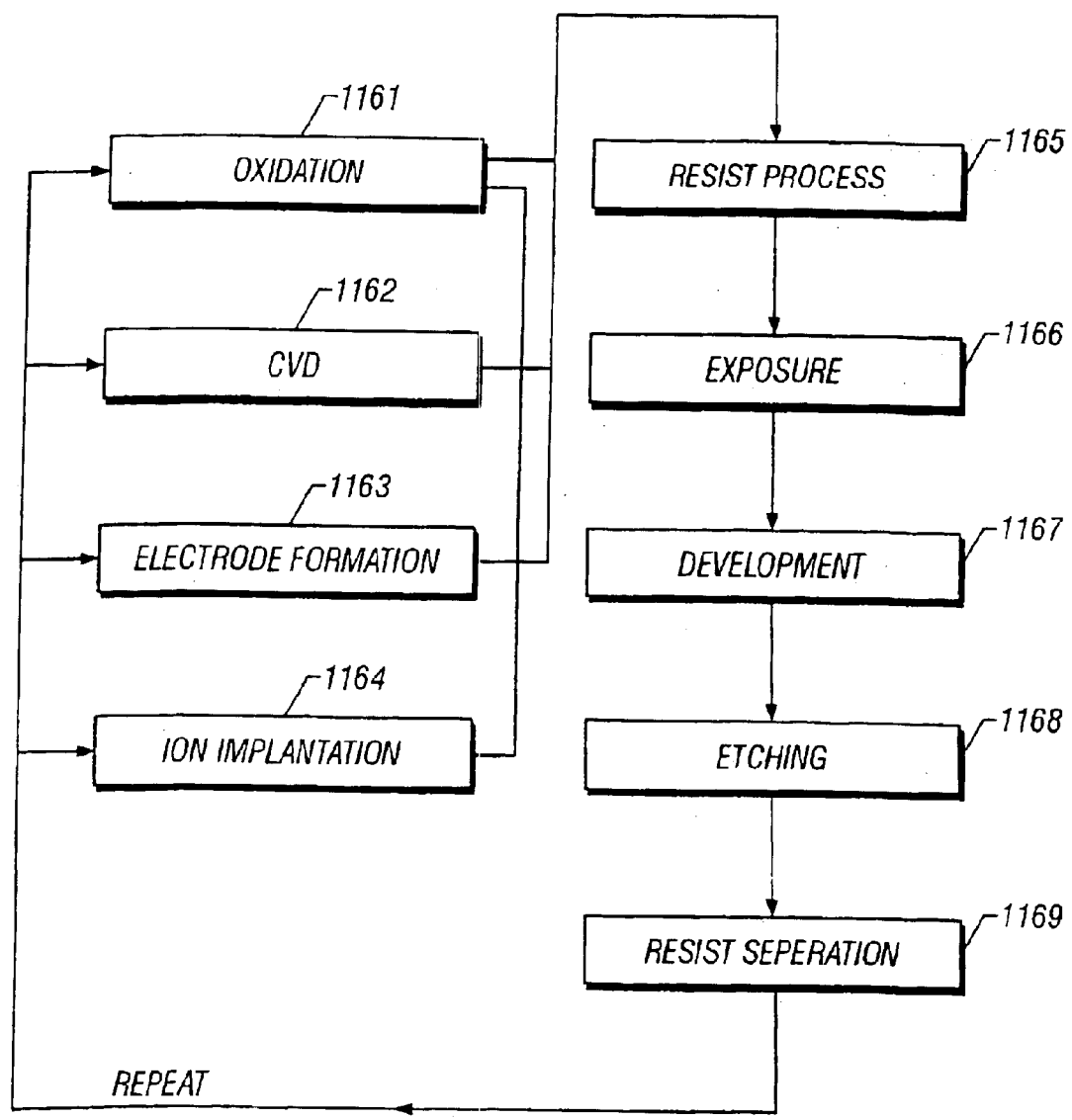

FIG. 10 is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 8:
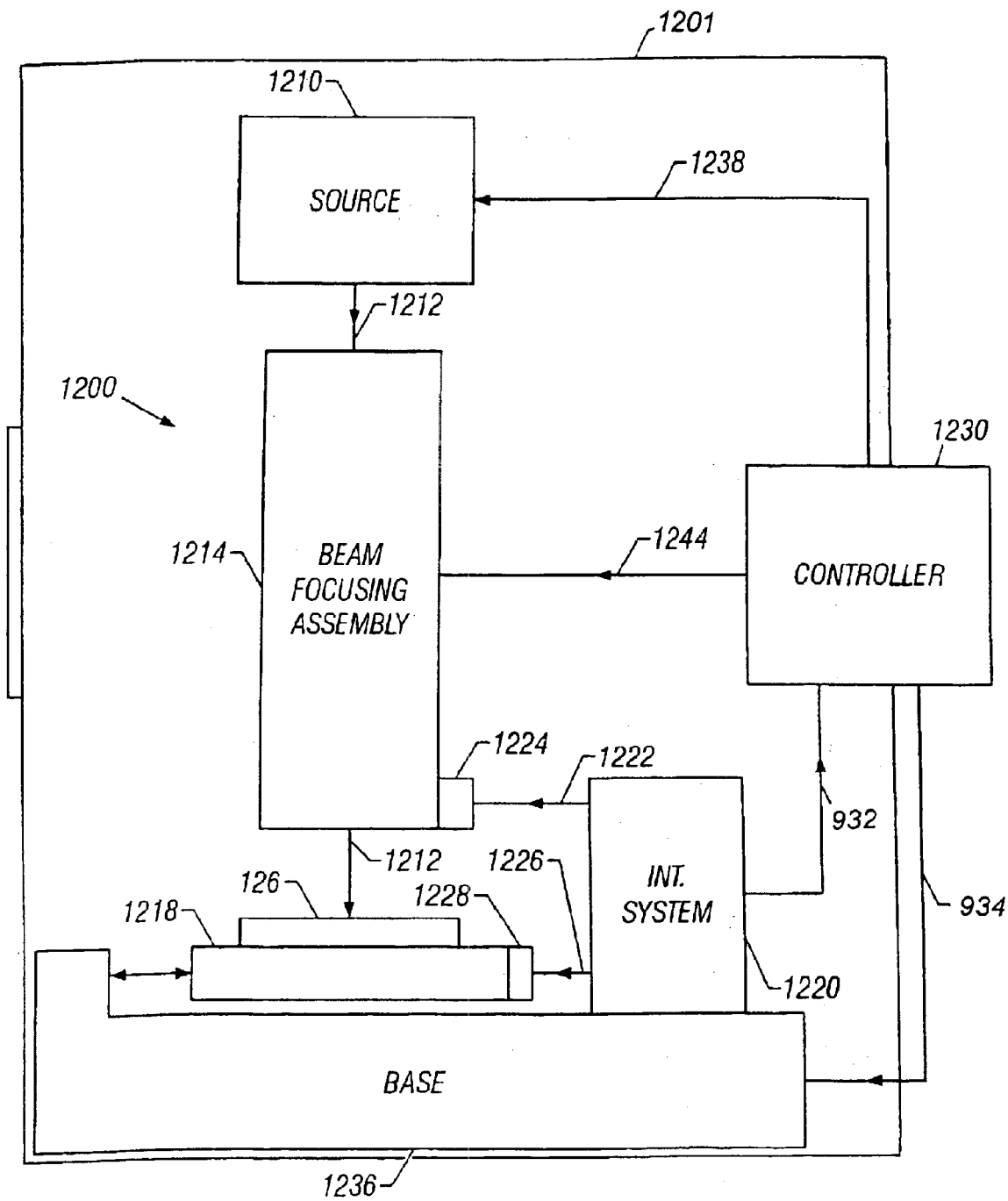
FIG. 8 is schematic of a beam writing system that includes an interferometry system.

As an example, a schematic of a beam writing system 1200 is shown in FIG 8. A chamber 1201 houses beam writing system 1200. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 932 to controller 1230 that is indicative of the relative position of write beam 1212 on substrate 1216. Controller 1230 sends an output signal 934 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate. Controller 1230 can be housed within chamber 1201, can be mounted on the outside of the chamber, or can be located at some location remote from chamber 1201.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromiumcoated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention. For example, although the embodiment described herein is with reference to a lithography system, the disclosed techniques can be used in other interferometry applications where the accuracy of the interferometry measurement may be compromised by time-varying optical properties of gas in the interferometer measurement and/or reference beam.

Furthermore, although the described interferometry system includes two displacement measuring interferometers and two angular displacement interferometers, other embodiments can include more or fewer than two displacement measuring interferometers and two angular displacement interferometers. For example, in embodiments where the orientation of the measurement object remains stationary, or where variations of the orientation of the measurement object are monitored independent of the interferometry system, the effect of time-varying optical properties of gas can be compensated by monitoring a single measurement beam.

Accordingly, other embodiments are within the scope of the following claims,

What is claimed is:

1. A method, comprising:
    interferometrically measuring first and second optical path lengths to a measurement object along respective first and second paths, wherein the measurement of the optical path lengths comprise directing first and second measurement beams to reflect from the measurement object;
    measuring propagation directions of the first and second measurement beams; and
    compensating the first measured optical path length for time-varying optical properties of gas in the first path based on the first and second measured optical path lengths and the first and second measured propagation directions.

2. The method of claim 1, wherein compensating the first measured optical path length further comprises compensating the first measured optical path length based on earlier measurements of the first and second optical path lengths and the first and second propagation directions.

3. The method of claim 2, wherein compensating the first measured optical path length further comprises compensating the first measured optical path length based on the velocity of gas in the first and second paths.

4. The method of claim 3, wherein compensating the measured optical path length comprises determining a corrected optical path length, $x_{1,0}$, according to the equation:

$$x_{1,0} = x_1 - u \int \left\{ \theta_1 - \left[ \frac{x_2 - x_1}{b} - \left(\frac{u}{b}\right) \int (\theta_2 - \theta_1) dt \right] \right\} dt$$

where $x_1$ and $x_2$ are the first and second measured optical path lengths, respectively, $\theta_1$ and $\theta_2$ are the first and second propagation directions, respectively, b is a distance between the first and second measurement beams, and u is a component of the gas velocity perpendicular to the beams and in the plane of the beams.

5. The method of claim 1, wherein the propagation directions of the first and second measurement beams are measured interferometrically.

6. The method of claim 1, further comprising deriving the first and second measurement beams from an input beam.

7. The method of claim 6, further comprising adjusting the propagation direction of the input beam based on variations in the propagation direction of the first or second measurement beams.

8. A method, comprising:
    interferometrically measuring an optical path length to a measurement object along a first path, wherein the measurement of the optical path length comprises directing a measurement beam to reflect from the measurement object;
    measuring a propagation direction of the measurement beam; and
    compensating the measured optical path length for time-varying optical properties of gas in the first path based on the measured propagation direction.

9. The method of claim 8, wherein compensating the measured optical path length further comprises compensating the measured optical path length based on a velocity of gas in the first path.

10. The method of claim 8, further comprising measuring a second optical path length to the measurement object along a second path substantially parallel to the first path.

11. The method of claim 10, further comprising measuring a propagation direction of the second measurement beam.

12. The method of claim 11, wherein the propagation direction of the second measurement beam is measured interferometrically.

13. The method of claim 11, wherein compensating the measured optical path length further comprises compensating the measured optical path length based on the measured propagation direction of the second measurement beam and the velocity of gas in the second path.

14. The method of claim 13, wherein the measured optical path length is compensated based on previous optical path length and measurement beam propagation direction measurements.

15. The method of claim 14, wherein compensating the measured optical path length comprises determining a corrected optical path length, $x_{1,0}$, according to the equation:

$$x_{1,0} = x_1 - u \int \left\{ \theta_1 - \left[ \frac{x_2 - x_1}{b} - \left(\frac{u}{b}\right) \int (\theta_2 - \theta_1) dt \right] \right\} dt$$

where $x_1$ and $x_2$ are the first and second measured optical path lengths, respectively, $\theta_1$ and $\theta_2$ are the first and second beam directions, respectively, b is a distance between the first and second measurement beams, and u is the component of the gas velocity perpendicular to the beams and in the plane of the beams.

16. The method of claim 8, wherein the propagation direction of the measurement beam is measured after the measurement beam reflects from the measurement object an odd number of times.

17. The method of claim 16, wherein the propagation of the measurement beam is measured after the measurement beam reflects from the measurement object once.

18. The method of claim 8, wherein measuring the optical path length comprises generating a heterodyne signal from the measurement beam and determining an interference phase from the heterodyne signal.

19. The method of claim 8, wherein the propagation direction of the first measurement beam is measured interferometrically.

20. The method of claim 10, wherein the first measured optical path length is compensated for variations in the orientation of the measurement object based on the second measured optical path length and a distance between the first and second measurement beams.

21. The method of claim 8, further comprising deriving the measurement beam from an input beam.

22. The method of claim 21, further comprising adjusting the propagation direction of the input beam based on variations in the propagation direction of the first measurement beam.

23. An interferometry system, comprising:
an interferometer configured to direct a measurement beam to reflect from a measurement object and interferometrically measure an optical path length to the measurement object along a first path based on the reflected measurement beam;
an angular displacement interferometer, configured to measure a propagation direction of the reflected measurement beam; and
a controller in communication with the interferometer and the angular displacement interferometer, wherein during operation the controller compensates the measured optical path length for time-varying optical properties of gas in the first path based on the measured optical path length and measured propagation direction.

24. A lithography method for use in fabricating integrated circuits on a wafer, the method comprising:
supporting the wafer on a moveable stage;
imaging spatially patterned radiation onto the wafer;
adjusting the position of the stage; and
monitoring the position of the stage using the method of claim 8.

25. A lithography method for use in the fabrication of integrated circuits comprising:
directing input radiation through a mask to produce spatially patterned radiation;
positioning the mask relative to the input radiation;
monitoring the position of the mask relative to the input radiation using the method of claim 8; and
imaging the spatially patterned radiation onto a wafer.

26. A lithography method for fabricating integrated circuits on a wafer comprising:
positioning a first component of a lithography system relative to a second component of a lithography system to expose the wafer to spatially patterned radiation; and
monitoring the position of the first component relative to the second component using the method of claim 8.

27. A method for fabricating integrated circuits, the method comprising the lithography method of claim 24.

28. A method for fabricating integrated circuits, the method comprising the lithography method of claim 25.

29. A method for fabricating integrated circuits, the method comprising the lithography method of claim 26.

30. A beam writing method for use in fabricating a lithography mask, the method comprising:
directing a write beam to a substrate to pattern the substrate;
positioning the substrate relative to the write beam; and
monitoring the position of the substrate relative to the write beam using the interferometry method of claim 8.

31. A lithography system for use in fabricating integrated circuits on a wafer, the system comprising:
a stage for supporting the wafer;
an illumination system for imaging spatially patterned radiation onto the wafer;
a positioning system for adjusting the position of the stage relative to the imaged radiation; and
the interferometry system of claim 23 for monitoring the position of the wafer relative to the imaged radiation.

32. A lithography system for use in fabricating integrated circuits on a wafer, the system comprising:
a stage for supporting the wafer; and
an illumination system including a radiation source, a mask, a positioning system, a lens assembly, and the interferometry system of claim 23,
wherein during operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

33. A beam writing system for use in fabricating a lithography mask, the system comprising:
a source providing a write beam to pattern a substrate;
a stage supporting the substrate;
a beam directing assembly for delivering the write beam to the substrate;
a positioning system for positioning the stage and beam directing assembly relative one another; and
the interferometry system of claim 23 for monitoring the position of the stage relative to the beam directing assembly.

* * * * *